United States Patent [19]

Guggenheim

[11] Patent Number: 4,948,154
[45] Date of Patent: Aug. 14, 1990

[54] STERILE CART COVER

[76] Inventor: Elie Guggenheim, 150 Park Dr., San Antonio, Tex. 78212

[21] Appl. No.: 356,171

[22] Filed: May 24, 1989

[51] Int. Cl.⁵ .............................................. B65D 65/26
[52] U.S. Cl. .................... 280/79.3; 150/154; 211/180; 280/47.35
[58] Field of Search ................. 280/79.3, 79.11, 47.35, 280/47.34, 762, 770; 696/77.1, 83, 100, 102, 136; 150/166, 154, 165; 135/88; 211/180

[56] References Cited

U.S. PATENT DOCUMENTS

| | | | |
|---|---|---|---|
| 3,143,154 | 8/1964 | Best | 150/154 |
| 3,182,566 | 5/1965 | Pyne | 128/132 |
| 3,241,850 | 3/1966 | Propst | 280/79.11 |
| 3,314,464 | 4/1967 | Veilleux | 150/154 |
| 3,445,150 | 5/1969 | Zartarian | 280/47.35 |
| 3,834,756 | 9/1974 | Grell | 296/136 |
| 3,853,329 | 12/1974 | McDonald | 280/47.35 |
| 4,098,536 | 7/1978 | Mills | 296/77.1 |
| 4,244,411 | 1/1981 | Karlstrom et al. | 150/154 |
| 4,432,591 | 2/1984 | Rinkewich | 312/297 |

Primary Examiner—David M. Mitchell
Attorney, Agent, or Firm—Fleit, Jacobson, Cohn, Price, Holman & Stern

[57] ABSTRACT

A cart for storing of sterilized material in plastic packaging, having a cart cover which provides visibility to the sterilized material packages while giving limited access to the interior of the cart for removal of only the packaged material needed while protecting the remainder of the sterilized packages stored on the cart. The cart is movable so as to be transported to different locations without compromising the integrity of the sterilized material packages. Flaps of the cart cover are openable and resealable by VELCRO-type closures. In addition, the closure flaps are made of a transparent vinyl for viewing the sterilized material packages to determine which package is needed. Inventory may be taken by viewing the sterilized package materials through the transparent vinyl closure flaps without handling of the sterilized material packages. The portions of the cart cover other than the four closure flaps which are made of transparent vinyl are made of a sturdy nylon fibric with polyurethane coating. The cart cover fits snugly on a metal frame so that when one closure flap is opened, the integrity of the remainder of the cart cover is maintained, thus decreasing the possibility of contamination of the contents of the cart by exposure to a non-sterile environment.

13 Claims, 2 Drawing Sheets

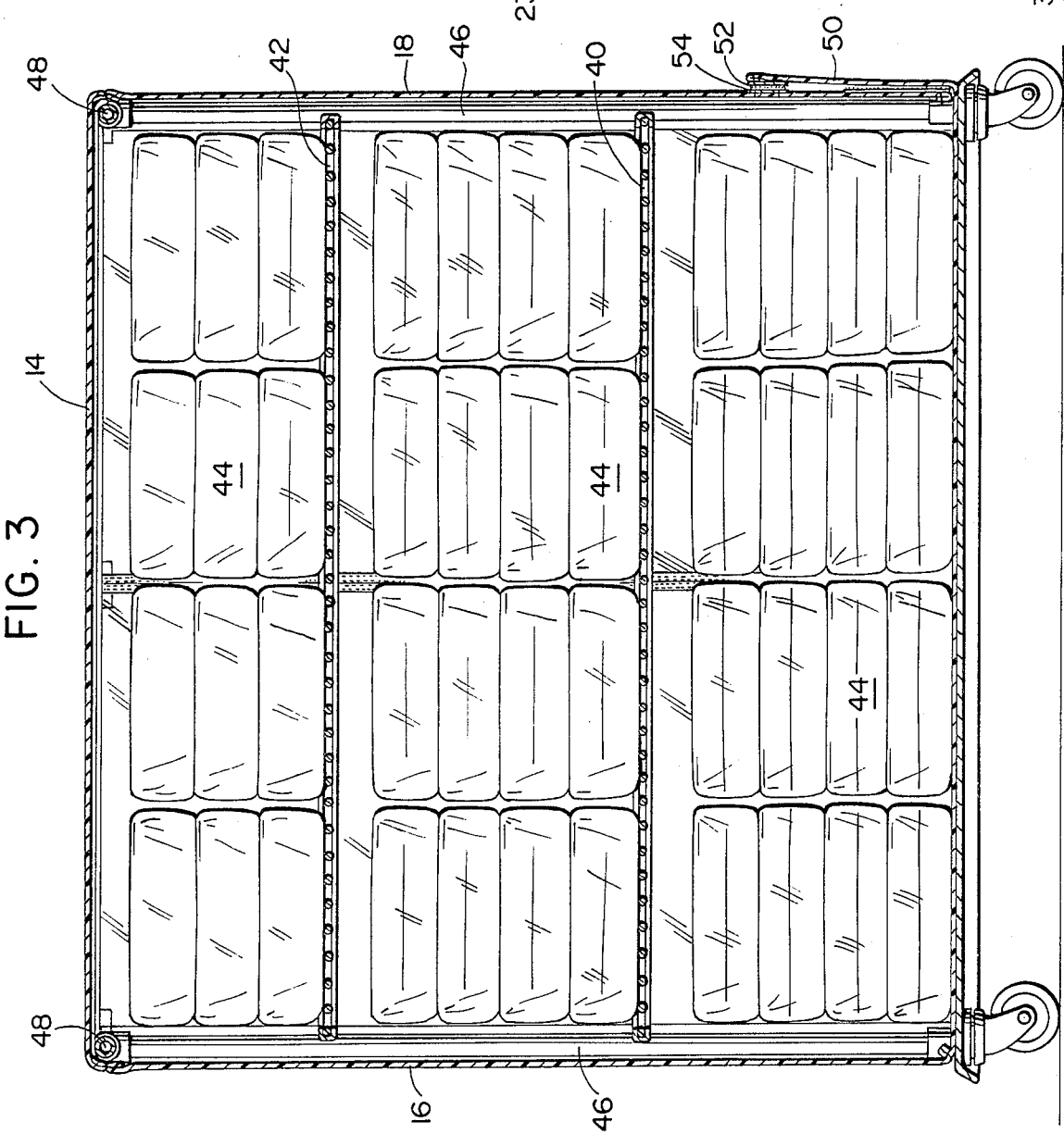

STERILE CART COVER

FIELD OF THE INVENTION

This invention relates to a cover for a cart having packages of sterile material such as garments which are enclosed in individual packages for use in a hospital setting or sterile environment.

BACKGROUND OF THE INVENTION

Oftentimes garments or material for use in a sterile environment are first sterilized and then packaged in individual packages. During storage in a hospital setting, the packages of sterile garments or material are subject to abuse during moving of the packages caused by shifting of inventory from one location to another, taking inventory of packages of sterile garments on hand and movement of several packages when a single package is desired to be withdrawn for use, to name just a few examples of how sterile garment packages are abused.

Due to the rough handling of the sterile garment packages, the sterility of the contents of the packages is jeopardized by the possible breakage or rupture of the bags which maintain the sterility of the hospital garments. Accordingly, it is a problem today in the medical field to maintain the sterility of materials which are sealed within plastic packaging to protect the sterile material against contamination.

SUMMARY OF THE INVENTION

The present invention includes a cart for storing of sterilized material in plastic packaging, having a cart cover which provides visibility to the sterilized material packages while giving limited access to the interior of the cart for removal of only the packaged material needed while protecting the remainder of the sterilized packages stored on the cart. The cart is movable so as to be transported to different locations without compromising the integrity of the sterilized material packages.

Flaps of the cart cover are openable and resealable by VELCRO-type closures. In addition, the closure flaps are made of a transparent vinyl for viewing the sterilized material packages to determine which package is needed. Inventory may be taken by viewing the sterilized package materials through the transparent vinyl closure flaps without handling of the sterilized material packages. The portions of the cart cover other than the four closure flaps which are made of transparent vinyl are made of a sturdy nylon fabric with polyurethane coating. The cart cover fits snugly on a metal frame so that when one closure flap is opened, the integrity of the remainder of the cart cover is maintained, thus decreasing the possibility of contamination of the contents of the cart by exposure to a non-sterile environment.

It is an object of the present invention to provide a cart cover for a cart housing packages of sterile material.

It is another object of the present invention to provide a cart cover for a cart housing packages of sterile material, the cart cover including resealable closure flaps for gaining limited access to the cart.

It is yet another object of the present invention to provide a cart cover for a cart housing packages of sterile material, the cart cover including resealable closure flaps for gaining limited access to the cart and the closure flaps being made of a transparent material for viewing the contents of the cart without exposing the contents of the cart to a non-sterile environment.

It is still yet another object of the present invention to provide a cart cover for a cart housing packages of sterile material, the cart cover including resealable closure flaps for gaining limited access to the cart and the closure flaps being made of a transparent material for viewing the contents of the cart without exposing the contents of the cart to a non-sterile environment and the cart being movable for transporting the sterile material packages stored on the cart to different locations without comprising the integrity of the packages of sterile material.

These and other objects of the invention, as well as many of the intended advantages thereof but will become more readily apparent when reference is made to the following description taken in conjunction with the accompanying drawings.

BRIEF DESCRIPTION OF THE DRAWINGS

FIG. 2 is a perspective view of a cart cover in an in use position.

FIG. 4 is a sectional view taken along lines 4—4 of FIG. 1.

DETAILED DESCRIPTION OF THE PREFERRED EMBODIMENTS

Figure 1:
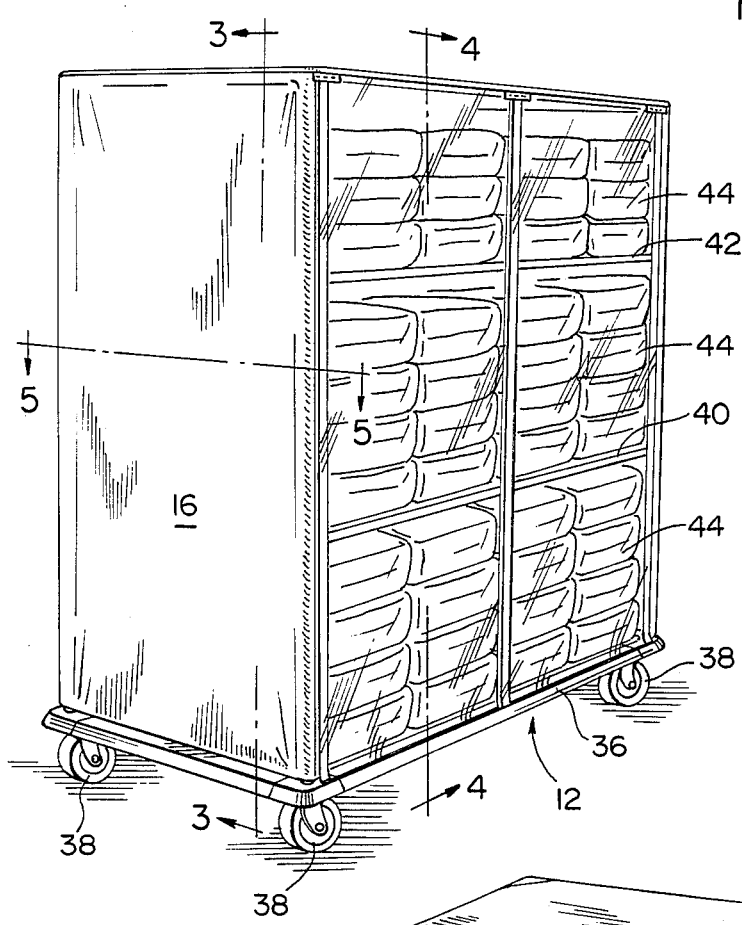
FIG. 1 is a perspective view of a cart having packages of sterile material enclosed by a cart cover.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIGS. 1 and 2, in particular, a cart and cart cover embodying the teachings of the subject invention are shown. The cart cover 10 is shown in FIG. 2 and is shown mounted onto a cart 12 in FIG. 1. The cart cover shown in FIG. 2 is in a use position without the presence of the supporting cart structure for illustrative purposes only.

The cart cover includes top panel 14, side panels 16 and 18 and bottom panel 20. These panels are preferably made of sturdy nylon fabric with polyurethane coating.

The cart cover also includes four closure flaps, two closure flaps on the front side of the cart cover and two closure flaps on the rear side of the cart cover. The two closure flaps 22 and 24 hang downwardly from the top panel 14 and are securely stitched to the top panel 14.

Figure 6:
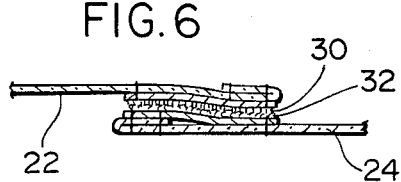
FIG. 6 is a sectional view taken along lines 6—6 of FIG. 2.

The closure panels are made of a transparent vinyl so as to view the interior of the cart and its contents. Along opposite vertical edges of the side panels 16 and 18 are located a strip 26 which forms one side of a hook and net, VELCRO-type fastener. The opposite or mating portion of the closure strips 28 are located along the outermost edge of closure panels 22 and 24. A similar closure is formed by strips 30 and 32 located at the inner edges of the panels 22 and 24 in the middle of the front panel. It is envisioned that any resealable closure which tightly seals the closure flaps 22 and 24 may be used along their inner and outer edges. FIG. 6 illustrates the securing of the innermost edges of the closure flaps 22 and 24 by the strips 30 and 32.

Figure 5:
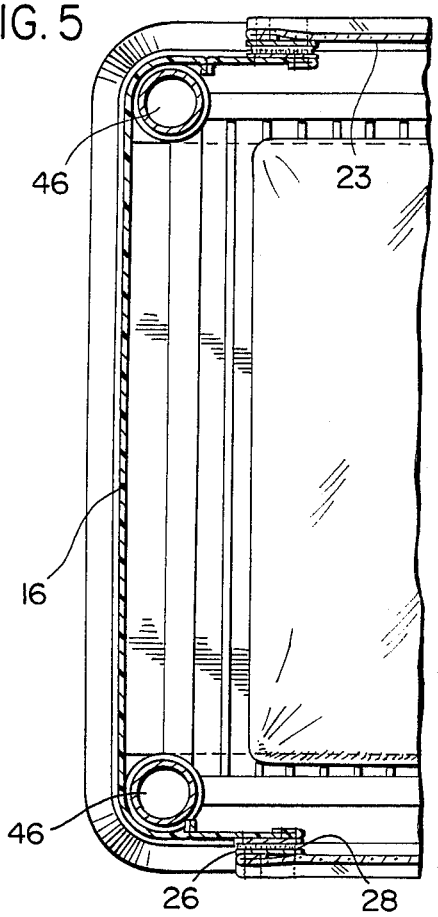
FIG. 5 is a sectional view taken along lines 5—5 of FIG. 1.

In addition, the rear closure panels of the cart cover which are shown in FIGS. 2, 4 and 5, are identified with a reference numeral 23 for one of the rear closure panels for the sake of clear illustration and both of which are similar in arrangement to the front closure panels 22 and 24.

At the top edge of the closure strips 26, 28 and 30, 32 are security flaps 34 which provide reinforcement against the detachment of the flaps 22 and 24 from the top panel 14 by repeated opening and closing of the sealing strips 26, 28 and 30, 32.

In FIG. 1, the cart which is enclosed by the cart cover 10 is shown having a base plate 36 to which is secured four caster wheels 38 for movement of the cart to a desired location. The cart 12 also includes two shelves 40 and 42 upon which are stacked packages of sterile material 44. Packages of sterile material are also stacked on the base plate 36. Interposed between the base plate 36 and the lowermost packages of sterile material is the bottom panel 20 of the cart cover 10.

Figure 3:
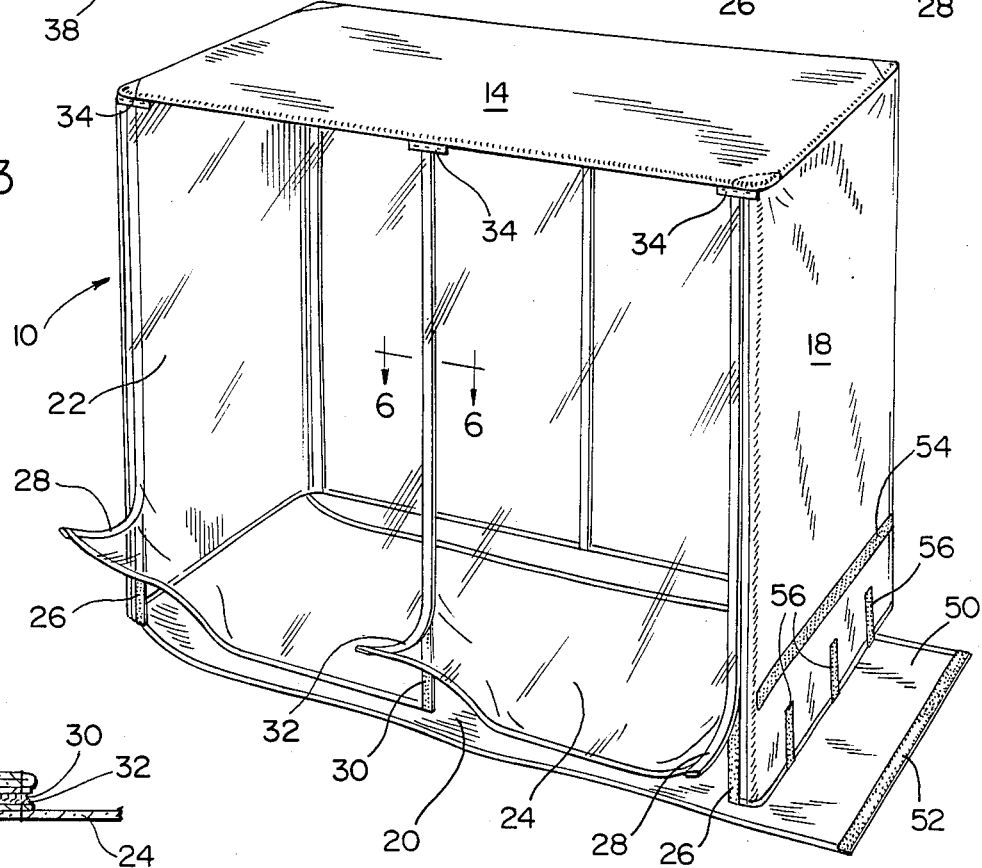
FIG. 3 is a sectional view taken along line 3—3 of FIG. 1.

As shown in FIGS. 3, 4 and 5, at each corner of the cart 12 are upstanding poles 46 which support the shelves 40 and 42 as well as supporting the form of the cart cover 10 in the use position. Interconnecting the uppermost ends of the poles 46 are crossbars 48.

The cart cover 10 is dimensioned to fit closely to the exterior dimensions of the framing of the cart 12 to provide a tight fit so that when one closure flap is opened to either put in or move a sterile material package from one of the shelves, the other closure panels are not disturbed. To provide for a sealing engagement with the cart structure, the base plate 36 includes an outwardly extending flange 38 which is contacted by the lowermost edges of the closure flaps so as to seal the interior of the cart cover.

In addition, an extended portion 50 of the bottom panel 20 includes a securing strip 52 which is secured to a mating securing strip 54 located on the side panel 18. If for any reason the securing of the extended portion 50 to the side panel 18 is disturbed, three safety securement strips 56 which extend perpendicular to strip 54 catch securing strip 52 in a securing manner as securing strip 52 is moved away from securing strip 54.

Therefore, access to the interior of the cart cover is only necessary to remove or replace sterile packages on the shelves of the cart. To remove a package, the left edge of closure flap 22 would be lifted by separating strip 28 from overlapping securing strip 26 so as to gain access to the material located behind the closure flap 22.

To gain access to the middle of the cart, securing strip 32 would be removed from securing strip 30 so that either closure flap 22 or 24 is moved for access to the middle of the cart and similarly, for access to the right side of the cart, sealing strip 24 is removed from overlapping sealing strip 26 to gain access to the material located at the right side of the cart. Similar movements are performed at the rear of the cart to gain access to the material located at the rear of the cart.

By the present invention, sterile material packages may be maintained in a sealed environment within a cart cover to minimize the exposure of the sterile packages to a non-sterile environment. Movement of the packages from one location to another is easily accomplished by movement on the cart 12 without the danger of the sterile packages falling off the cart due to the constraints imposed by the cart cover. In addition, inventory of the sterile material packages may be easily performed by viewing through the transparent closure flaps.

Having described the invention, many modifications thereto will become apparent to those skilled in the art to which it pertains without deviation from the spirit of the invention as defined by the scope of the appended claims.

I claim:

1. A cart cover for a cart supporting packages of sterile material stored thereon, said cart cover comprising:
    a top panel;
    a bottom panel;
    a first side panel interconnecting said top panel and said bottom panel;
    a second side panel interconnecting said top panel and said bottom panel;
    at least one front panel connected to said top panel and releasably connected to said first side panel and said second side panel for access to an interior of an enclosure defined by the cart cover; and
    at least one rear panel connected to said top panel and interconnecting said first side panel and said second side panel,
    said second side panel being releasably secured to said bottom panel.

2. A cart cover for a cart supporting packages of sterile material stored thereon as claimed in claim 1, which said rear panel is releasably connected to said first side panel and said second side panel.

3. A cart cover for a cart supporting packages of sterile material stored thereon as claimed in claim 1, wherein said at least one front panel is two panels.

4. A cart cover for a cart supporting packages of sterile material stored thereon as claimed in claim 3, wherein said two panels include means for releasably securing said two panels to said first side panel and said second side panel and means for releasably securing said two panels to each other.

5. A cart cover for a cart supporting packages of sterile material stored thereon as claimed in claim 1, wherein said at least one front panel is transparent.

6. A cart cover for a cart supporting packages of sterile material stored thereon as claimed in claim 5, wherein said at least one rear panel is transparent.

7. A cart cover for a cart having packages of sterile material stored thereon, said cart cover comprising:
    a top panel;
    a bottom panel;
    a first side panel connected to said top panel and connected to said bottom panel;
    a second side panel interconnecting said top panel and said bottom panel, said second side panel being releasably secured to said bottom panel;
    front panel means connected to said top panel and releasably connected to said first side panel and said second side panel for gaining access to the interior of a space defined by the cart cover; and
    rear panel means interconnecting said top panel, said first side panel and said second side panel.

8. A cart cover for a cart having packages of sterile material stored thereon as claimed in claim 7, wherein said front panel means includes a securing strip along one edge for engaging and releasing from a securing strip along an edge of at least one of said first side panel and said second side panel.

9. A cart cover for a cart having packages of sterile material stored thereon as claimed in claim 7, wherein said front panel means includes at least two securing strips and said first side panel and said second side panel each include a complementary securing strip.

10. A cart cover for a cart having packages of sterile material stored thereon as claimed in claim 7, wherein said front panel means is transparent.

11. A movable enclosure for storing packages of sterile material, said movable enclosure comprising:
a cart having a base plate, wheels mounted on said base plate and upright supports mounted on said base plate; and
a cart cover supported by said upright supports to define an enclosed space for storage of packages of sterile material therein, said cart cover including at least one releasably secured closure panel for gaining access to said enclosed space, and a transparent portion for viewing the contents of said enclosed space,
said cart cover including a top panel, a bottom panel, a first side panel interconnecting said top panel and said bottom panel, a second side panel interconnecting said top panel and said bottom panel, said at least one closure panel being connected to said top panel and releasably secured to said first side panel and said second side panel to form a front panel and at least one rear panel being connected to said top panel and interconnecting said first side panel and said second side panel, and
said bottom panel being releasably secured to said second side panel.

12. A movable enclosure for storing packages of sterile material as claimed in claim 11, wherein said at least one closure panel and said transparent portion are one and the same.

13. A movable enclosure for storing packages of sterile material as claimed in claim 11, wherein said bottom panel is located on top of said base plate.

* * * * *